US011035609B2

(12) United States Patent
Swab (10) Patent No.: US 11,035,609 B2
(45) Date of Patent: Jun. 15, 2021

(54) EDGE FLUORESCING ACRYLIC LIGHT BAR DISPLAY FOR TRANSPORTATION REFRIGERATION UNITS

(71) Applicant: Carrier Corporation, Jupiter, FL (US)

(72) Inventor: Michael Thomas Swab, Acworth, GA (US)

(73) Assignee: Carrier Corporation, Palm Beach Gardens, FL (US)

( * ) Notice: Subject to any disclaimer, the term of this patent is extended or adjusted under 35 U.S.C. 154(b) by 736 days.

(21) Appl. No.: 15/726,741

(22) Filed: Oct. 6, 2017

(65) Prior Publication Data
US 2018/0128542 A1 May 10, 2018

Related U.S. Application Data

(60) Provisional application No. 62/418,518, filed on Nov. 7, 2016.

(51) Int. Cl.
| | | |
|---|---|---|
| *F25D 27/00* | (2006.01) | |
| *B60P 3/20* | (2006.01) | |
| *F25D 11/00* | (2006.01) | |
| *F25D 29/00* | (2006.01) | |

(52) U.S. Cl.
CPC .............. *F25D 27/005* (2013.01); *B60P 3/20* (2013.01); *F25D 11/003* (2013.01); *F25D 29/003* (2013.01); *F25D 2400/36* (2013.01)

(58) Field of Classification Search
CPC .... F25D 27/005; F25D 29/003; F25D 11/003; F25D 2400/36; B60P 3/20
See application file for complete search history.

(56) References Cited

U.S. PATENT DOCUMENTS

| | | | | | |
|---|---|---|---|---|---|
| 2,464,535 | A | * | 3/1949 | Smith, Jr. | ................ B60Q 1/50 340/470 |
| 2,477,022 | A | * | 7/1949 | Volk | ........................ G09F 13/16 40/454 |
| 2,485,719 | A | * | 10/1949 | Edwards | ........................ 340/458 |
| 2,517,173 | A | * | 8/1950 | Blasingame | ......... B60Q 1/2607 340/470 |
| 2,571,445 | A | * | 10/1951 | Hawkes | ................ F25D 19/003 62/236 |

(Continued)

OTHER PUBLICATIONS

LED Light Bar, Sep. 2006, Carrier Transicold Performance Parts, Cranston, Rhode Island.
(Continued)

*Primary Examiner* — Nimeshkumar D Patel
*Assistant Examiner* — Tania Courson
(74) *Attorney, Agent, or Firm* — Bachman & LaPointe, P.C.

(57) ABSTRACT

An indicator display (20) comprises a fluorescent plastic first member (30) of a first color and having a first face (40) and a fluorescent plastic second member (32) of a second color, different from the first color, and having a first face (42). One or more first light emitting diodes (60) are between the first member and the second member and positioned to illuminate the first member preferentially to the second member. One or more second light emitting diodes (62) are between the first member and the second member and positioned to illuminate the second member preferentially to the first member.

20 Claims, 5 Drawing Sheets

(56) References Cited

U.S. PATENT DOCUMENTS

| | | | | |
|---|---|---|---|---|
| 2,588,183 A * | 3/1952 | Vigon | G09F 7/10 | 40/542 |
| 2,617,221 A * | 11/1952 | Fuchs | G02B 6/0031 | 40/546 |
| 2,673,307 A * | 3/1954 | Weishuhn | B60Q 1/503 | 315/77 |
| 2,689,917 A * | 9/1954 | Switzer | G02B 6/0081 | 250/462.1 |
| 2,707,346 A * | 5/1955 | Fuller, Jr. | G09F 13/0409 | 40/580 |
| 2,814,028 A * | 11/1957 | Hamilton | G07B 13/045 | 340/434 |
| 2,854,650 A * | 9/1958 | Baker | B60Q 1/503 | 340/470 |
| 3,276,216 A | 10/1966 | Papapanu | | |
| 3,320,586 A * | 5/1967 | Wagner | B60Q 1/444 | 340/464 |
| 3,517,384 A * | 6/1970 | Jablonski | B60Q 1/50 | 340/468 |
| 3,678,457 A * | 7/1972 | Lev | B60Q 1/503 | 340/468 |
| 3,928,226 A | 12/1975 | McDonough et al. | | |
| 4,135,754 A * | 1/1979 | FitzGerald | B62D 35/001 | 296/15 |
| RE30,637 E * | 6/1981 | King | G09F 11/23 | 116/315 |
| 4,298,802 A | 11/1981 | Quella et al. | | |
| 4,424,449 A * | 1/1984 | O'Brill | G09F 13/20 | 250/461.1 |
| 4,455,096 A * | 6/1984 | Brandstedt | B60Q 9/00 | 340/425.5 |
| 4,557,517 A * | 12/1985 | Bolduc | B62D 35/001 | 296/180.4 |
| 4,896,251 A * | 1/1990 | Fasel | B60Q 1/2615 | 362/362 |
| 4,989,956 A | 2/1991 | Wu et al. | | |
| 5,009,019 A * | 4/1991 | Erlendsson | G09F 13/20 | 40/541 |
| 5,032,711 A * | 7/1991 | Yamada | G01D 7/04 | 250/461.1 |
| 5,099,343 A | 3/1992 | Margerum et al. | | |
| 5,105,179 A * | 4/1992 | Smith | B60Q 1/56 | 340/461 |
| 5,128,846 A * | 7/1992 | Mills | F21V 9/08 | 362/223 |
| 5,181,389 A * | 1/1993 | Hanson | B60H 1/00985 | 340/589 |
| 5,207,492 A * | 5/1993 | Roberts | F21V 9/20 | 362/23.19 |
| 5,504,661 A * | 4/1996 | Szpak | G01D 11/28 | 340/815.47 |
| 5,536,558 A * | 7/1996 | Shelton | G09F 13/20 | 156/209 |
| 5,539,623 A * | 7/1996 | Gurz | G09F 13/14 | 362/20 |
| 5,559,681 A * | 9/1996 | Duarte | F21V 21/08 | 362/231 |
| 5,594,560 A | 1/1997 | Jelley et al. | | |
| 5,604,480 A * | 2/1997 | Lamparter | B60Q 1/50 | 340/433 |
| 5,636,462 A * | 6/1997 | Kleiman | G09F 7/20 | 248/126 |
| 5,751,212 A * | 5/1998 | Findley | B60Q 1/488 | 116/63 P |
| 6,023,869 A | 2/2000 | Durbin | | |
| 6,037,866 A * | 3/2000 | Leibowitz | B60Q 7/00 | 340/431 |
| 6,131,322 A * | 10/2000 | Hjaltason | G09F 13/20 | 40/615 |
| 6,167,648 B1 * | 1/2001 | Dimmick | G09F 9/33 | 313/51 |
| 6,371,625 B2 * | 4/2002 | Campman | G08B 5/004 | 362/184 |
| 6,584,714 B1 | 7/2003 | Wehrmann et al. | | |
| 6,821,007 B1 * | 11/2004 | Olman | F21V 9/00 | 362/511 |
| 6,897,771 B1 * | 5/2005 | Lodhie | B60Q 1/2607 | 340/464 |
| 7,046,125 B2 * | 5/2006 | Fugit | B60Q 1/50 | 340/323 R |
| 7,142,098 B2 * | 11/2006 | Lang | B60D 1/62 | 340/431 |
| 7,162,821 B2 * | 1/2007 | Venkataraman | G09F 13/04 | 40/541 |
| 7,315,036 B2 * | 1/2008 | Ford | H05B 45/00 | 250/504 R |
| 7,495,384 B2 | 2/2009 | Hajto et al. | | |
| 7,681,347 B1 | 3/2010 | Welker et al. | | |
| 7,696,865 B1 * | 4/2010 | Robinson | B60Q 1/503 | 340/472 |
| 7,733,310 B2 | 6/2010 | Hajjar et al. | | |
| 8,004,507 B2 * | 8/2011 | Boudewyns | B60H 1/00985 | 345/204 |
| 8,072,686 B2 * | 12/2011 | Cui | G02B 27/0101 | 359/630 |
| 8,111,250 B2 | 2/2012 | Boudewyns et al. | | |
| 8,353,605 B2 * | 1/2013 | Huang | F21V 33/0052 | 362/240 |
| 8,375,613 B2 | 2/2013 | Spiro | | |
| 8,400,265 B2 * | 3/2013 | Sarioglu | E05B 17/10 | 340/5.72 |
| 8,466,438 B2 | 6/2013 | Lambert et al. | | |
| 8,606,430 B2 * | 12/2013 | Seder | B60Q 1/503 | 701/2 |
| 8,692,739 B2 * | 4/2014 | Mathieu | G02B 27/01 | 345/7 |
| 8,910,403 B2 * | 12/2014 | Nimtz | G09F 21/04 | 40/590 |
| 8,938,897 B2 * | 1/2015 | Borreggine | B60Q 1/503 | 40/541 |
| 8,984,780 B2 | 3/2015 | Brassell et al. | | |
| 9,010,976 B2 * | 4/2015 | Shipman | G09F 13/20 | 340/472 |
| 9,087,463 B2 * | 7/2015 | Hsu | G09F 13/04 | |
| 9,390,637 B2 * | 7/2016 | Varveris | A47G 1/0616 | |
| 9,494,305 B2 * | 11/2016 | Tischler | F21V 21/14 | |
| 10,220,767 B2 * | 3/2019 | Lee | B60Q 1/50 | |
| 2003/0021121 A1 * | 1/2003 | Pederson | F21S 4/22 | 362/493 |
| 2004/0231209 A1 * | 11/2004 | Love | G09F 13/02 | 40/591 |
| 2005/0001433 A1 * | 1/2005 | Seelin | G09F 21/048 | 290/44 |
| 2008/0028650 A1 * | 2/2008 | Ratcliffe | B60R 13/005 | 40/591 |
| 2008/0115395 A1 * | 5/2008 | Saito | G09F 13/20 | 40/564 |
| 2009/0051522 A1 * | 2/2009 | Perkins | B60Q 1/2603 | 340/468 |
| 2009/0091915 A1 * | 4/2009 | Eriksson | F21V 9/45 | 362/84 |
| 2009/0180296 A1 | 7/2009 | Chen et al. | | |
| 2010/0253595 A1 * | 10/2010 | Szczerba | G01S 13/931 | 345/7 |
| 2011/0085287 A1 * | 4/2011 | Ebrom | F24C 7/08 | 361/679.01 |
| 2011/0277361 A1 * | 11/2011 | Nichol | G02B 6/0018 | 40/541 |
| 2014/0007474 A1 * | 1/2014 | Varveris | G09F 13/22 | 40/544 |
| 2014/0196328 A1 | 7/2014 | Swartz | | |
| 2014/0259819 A1 | 9/2014 | Dalpra | | |
| 2014/0300462 A1 * | 10/2014 | Russ | B60Q 1/46 | 340/471 |

(56) References Cited

U.S. PATENT DOCUMENTS

| | | | | |
|---|---|---|---|---|
| 2015/0068081 A1* | 3/2015 | Mimura | ............... | G09F 13/04 |
| | | | | 40/564 |
| 2015/0194082 A1* | 7/2015 | McEwan | ............ | G09F 21/048 |
| | | | | 40/209 |
| 2015/0294572 A1* | 10/2015 | Anstett | ................. | G08G 1/04 |
| | | | | 340/932.2 |

OTHER PUBLICATIONS

Remote Status Light and Combination Displays, Feb. 20, 2008, Thermo King, Ingersoll Rand Climate Control Technologies, Appleton, Wisconsin.
Acriglas Fluorescent, Edge Color & Lisa Acrylic Sheets, Aug. 28, 2000, Acrilex Inc, Jersey City, New Jersey.
Plexiglas ELIT II, Edge-Lit Technology Acrylic Sheet, Feb. 25, 2013, Altuglas International, Bristol, Pennsylvania.
Plexiglas MC Edge Color Series, Acrylic Sheet, Sep. 6, 2006, Altuglas International, Philadelphia, Pennsylvania.
Plexiglas MC Fluorescent Color Series, Acrylic Sheet, Sep. 6, 2006, Altuglas International, Philadelphia, Pennsylvania.

* cited by examiner

EDGE FLUORESCING ACRYLIC LIGHT BAR DISPLAY FOR TRANSPORTATION REFRIGERATION UNITS

CROSS-REFERENCE TO RELATED APPLICATION

Benefit is claimed of U.S. Patent Application No. 62/418,518, filed Nov. 7, 2016, and entitled "Edge Fluorescing Acrylic Light Bar Display for Transportation Refrigeration Units", the disclosure of which is incorporated by reference herein in its entirety as if set forth at length.

BACKGROUND

The disclosure relates to transport refrigeration. More particularly, the disclosure relates to status lights for trailers and containers.

Often, transport refrigeration units (TRU) will have external status displays. Key examples involve truck boxes, refrigerated trailer boxes, and refrigerated intermodal containers (which may be carried on trailers). In trailer situations, the display may be positioned so as to be visible to the driver seated in the truck or tractor cab (e.g., via a side or center rear view mirror).

One example is found in U.S. Pat. No. 8,111,250. Other indicators comprise a binary status indicator (often termed "light bar") such as where two groups of light emitting diodes (LED) are behind different color lenses (e.g., green and amber) so that green light is used to indicate normal operational condition and amber light is used to indicate an abnormal condition needing further investigation by the driver. The indicator may be triggered in response to one or more of numerous specific abnormal conditions, including: low-fuel in a unit having a genset; engine over temperature; cargo box out of set point range; and mechanical faults such as high pressure in the refrigeration system.

Separately, fluorescent dye-doped acrylics have been developed. Early efforts are reflected in U.S. Pat. Nos. 3,276,216 and 3,928,226 and such materials were commercialized under the trademark LISA of the former Mobay Chemical Corporation, but are now available from numerous sources in multiple colors and typically identified as "fluorescent cast acrylic". These acrylics are used, inter alia, in edge-lit signage.

SUMMARY

One aspect of the disclosure involves an indicator display comprising: a fluorescent plastic first member of a first color and having a first face; and a fluorescent plastic second member of a second color, different from the first color, and having a first face. One or more first light emitting diodes are between the first member and the second member and positioned to illuminate the first member preferentially to the second member. One or more second light emitting diodes are between the first member and the second member and positioned to illuminate the second member preferentially to the first member.

In one or more embodiments of any of the foregoing embodiments, the one or more first light emitting diodes are on a first strip or tape and the one or more second light emitting diodes are on a second strip or tape facing oppositely to the first strip or tape.

In one or more embodiments of any of the foregoing embodiments, one or more of: the first and second members are fluorescent dye-doped acrylic; the first member first face and second member first face are coplanar; and the first member first face and second member first face bear relieved indicia.

In one or more embodiments of any of the foregoing embodiments, the indicator further comprises a light sensor.

In one or more embodiments of any of the foregoing embodiments, the light sensor is between the first member and the second member.

In one or more embodiments of any of the foregoing embodiments, the light sensor is a phototransistor.

In one or more embodiments of any of the foregoing embodiments, a transport refrigeration system comprises the indicator display and further comprises a container having an interior and an exterior and a refrigeration system positioned for cooling the interior. The indicator is positioned on the exterior.

In one or more embodiments of any of the foregoing embodiments, the transport is a trailer.

In one or more embodiments of any of the foregoing embodiments, the transport refrigeration system further comprises a controller configured to operate the indicator: in a first condition wherein the one or more first light emitting diodes are on and the one or more second light emitting diodes are off; and in a second condition wherein the one or more first light emitting diodes are off and the one or more second light emitting diodes are on.

In one or more embodiments of any of the foregoing embodiments, the controller is configured to detect an abnormal situation and, responsive to the detecting, switch the indicator from the first condition to the second condition.

In one or more embodiments of any of the foregoing embodiments, the abnormal situation is selected from the group consisting of a low-fuel situation, a loss-of-refrigerant situation, engine over temperature, cargo box out of set point range, and high pressure in the refrigeration system.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
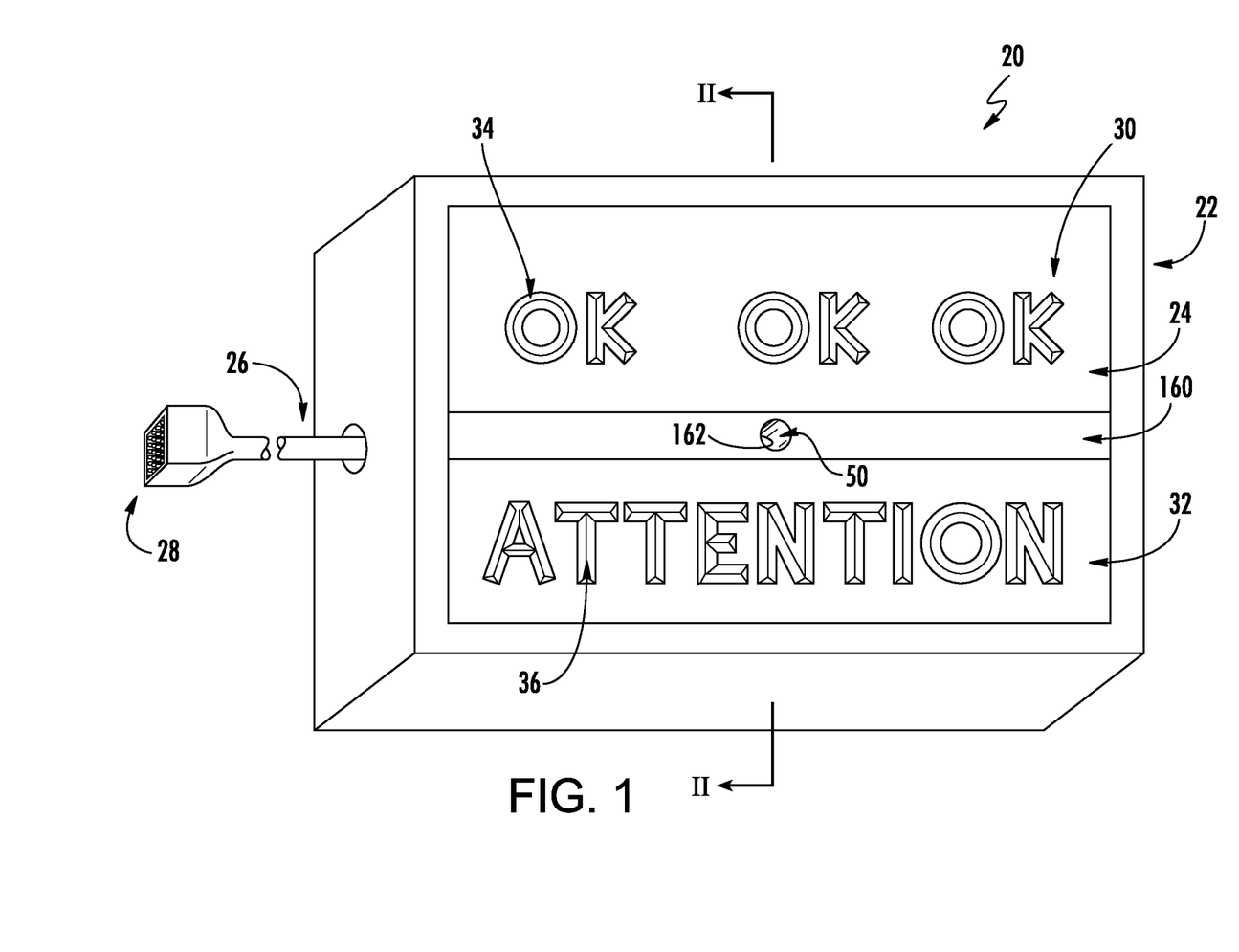
FIG. 1 is a view of an indicator display.

FIG. 1 shows an indicator display 20 comprising a housing 22 and a display unit 24 held by/within the housing. The housing has an open front end through which the display unit is visible. The exemplary housing may be molded or machined plastic, machined, or bent metal, or the like. Wiring 26 extends from the display unit through the housing to a connector 28. Alternatively, the connector 28 may be mounted on the housing and a separate cable or other wiring may connect thereto. As is discussed further below, the display unit 24 includes a first portion 30 and a second portion 32 for respectively displaying two different status indicia.

As is discussed further below, the first and second portions may be formed as respective first and second fluorescent plastic members (e.g., the aforementioned fluorescent dye-doped acrylics) of different coloration which are selectively lit via light emitting diodes (LEDs) (discussed below). The display unit portions may also have written or other graphical indicia which become apparent, or at least more prominent, when lit. Exemplary respective indicia 34 and 36 of the two portions may be formed such as via engraving or molding-in recesses to first surfaces 40 and 42 (FIG. 2) of the two portions. Engraving or other contouring may leave facets that increase the surface area for light to pass.

Figure 2:
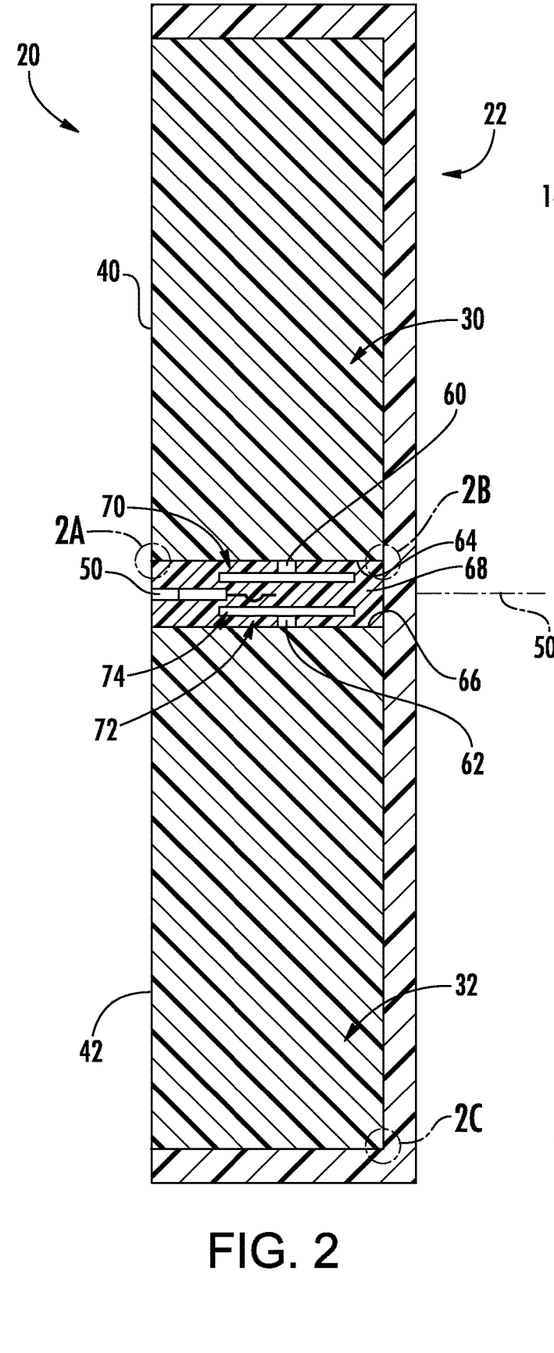
FIG. 2 is a cutaway via of the display of FIG. 1 taken along plane II-II.
Figure 2A:
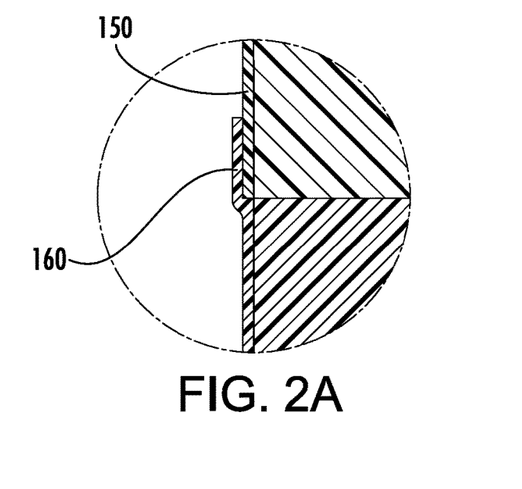
FIG. 2A is an enlarged view of a portion of the display of FIG. 2.
Figure 2B:
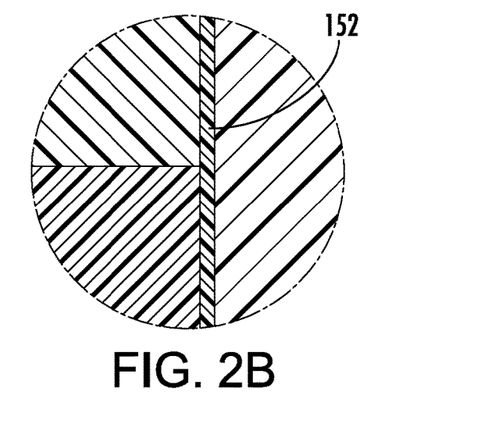
FIG. 2B is an enlarged view of a portion of the display of FIG. 2.
Figure 2C:
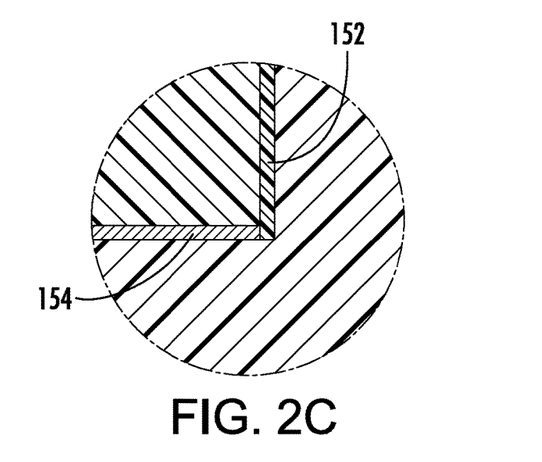
FIG. 2C is an enlarged view of a portion of the display of FIG. 2.

Regions of the first surfaces 40 and 42 away from the indicia may be masked such as via paint 150 (FIG. 2A). Additionally or alternatively, other surfaces of the portions 30, 32 may have reflective or absorptive coatings or be in contact with members having reflective or absorptive properties. One example is an absorptive (e.g., matte black) coating or material 152 (FIG. 2B) on the backsides of the portions 30, 32 or on the mating front face of the rear wall of the housing. This absorptive material prevents fluorescing of the members due to ambient light entering the front faces and then reflecting back. Transverse surfaces (e.g. along or of the interior surfaces of the perimeter wall portions of the housing may bear a reflective coating or material 154 (FIG. 2C) (e.g., white or metallic).

Also a separate pre-formed housing is shown, alternative embodiments may lack a housing or have an in situ formed housing. For example, the fluorescent plastic may be wrapped with tape or painted or otherwise coated. In the illustrated example, the first portion 30 is provided to indicate a normal or acceptable condition; whereas, the second portion 32 is configured to provide an alert or warning. In the exemplary embodiment, the surfaces 40 and 42 are flat and coplanar with each other. FIG. 1 also shows a light sensor 50 between the first portion 30 and second portion 32. An exemplary light sensor is a phototransistor-, photodiode-, or photoresistor-type sensor. Alternative mounting positions for the sensor 50 (if present at all) may include other locations on the housing 22.

FIG. 2 shows one or more first LEDs 60 positioned to illuminate the first portion 30 preferentially to the second portion 32 (i.e., more than the second portion, if the second portion at all). One or more second LEDs 62 are positioned to illuminate the second portion 32 preferentially to the first portion. In this example, to provide the preferential lighting, the first diodes face toward an edge 64 of the first portion 30 and away from an adjacent edge 66 of the second portion 32. The second LEDs face oppositely. Thus, in this exemplary embodiment, both sets of LEDs are accommodated in a gap between the portions 30 and 32. As is discussed further below, the gap may largely be filled with an in situ formed member such as a body 68 of potting material (e.g., cured in place). An exemplary potting material is an optically clear epoxy. An exemplary two-part epoxy is available from M.G. Chemicals, Ltd., Burlington, Ontario, Canada, under product no. 8322. The exposed front face of the body 68 may be covered by the paint 150 or by a separate material 160 (FIG. 2A) (e.g., tape) to prevent infiltration of ambient light to reduce unintended fluorescing. The material 160 may have a hole 162 (FIG. 1) through which the sensor 50 is exposed or protrudes.

Figure 3:
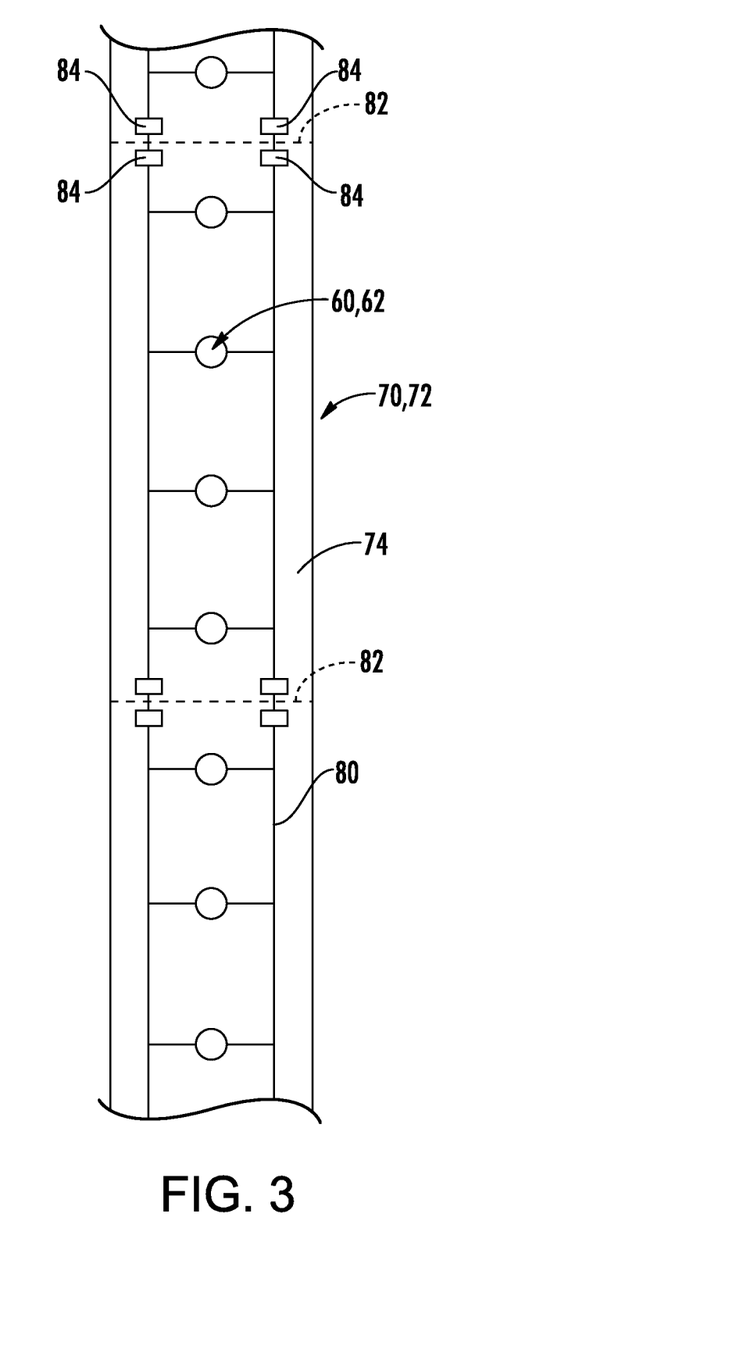
FIG. 3 is a plan view of an LED tape.

Arrays of the LEDs may be pre-formed as respective strips or tapes 70, 72. Exemplary strips or tapes comprise a strip or tape carrier 74 with the associated LEDs mounted on one face of the carrier. Exemplary LED tapes are commercially available pre-formed with conductive traces 80 (FIG. 3) on the carrier. When the tapes are cut at predetermined locations 82, the traces leave contacts 84 which may be mated to a wiring connector (not shown). Alternative embodiments may have discrete LEDs or LEDs mounted on circuit boards rather than tapes. Wiring extending from such connector may form or be connected to the wiring 26 and/or connector 28.

FIG. 2 also shows the light sensor 50 and its wiring which may pass through the body 68 to become or be connected to the wiring 26 and connector 28. Thus, in an exemplary embodiment, the connector 28 includes one or more separate contacts for independently powering the two groups of light emitting diodes and one or more contacts for sensor output. Yet other functions may be integrated with the indicator display 20 but are not discussed herein.

In the exemplary embodiment, commensurate with the binary status indication, the first portion 30 comprises plastic doped with a green fluorescent dye so that when lit the green universal color of normal operating condition is displayed. FIG. 1 shows three "OK" indicia 34 to be illuminated for normal operating condition. The second portion 32 may be otherwise similar material but doped with a different color such as red or amber to indicate an abnormal/alert condition. FIG. 1 shows an "ATTENTION" indicia 36 to be illuminated for an abnormal/alert condition (e.g., a situation selected from the group consisting of a low-fuel situation, a loss-of-refrigerant situation, engine over temperature, cargo box out of set point range, and high pressure in the refrigeration system). With the two portions being fluorescent dope, both sets of LEDs may be the same color such as a basic white LED.

Figure 4:
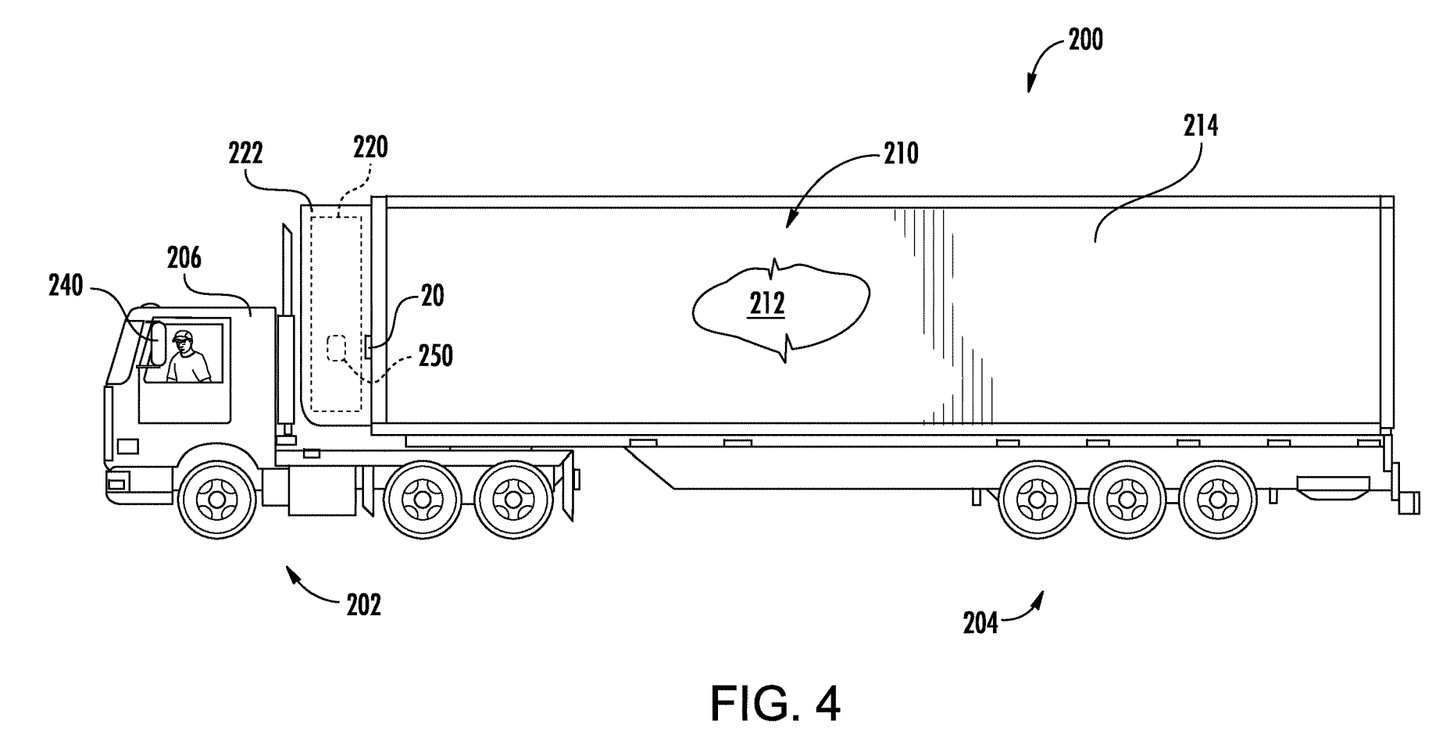
FIG. 4 is a side view of a truck and refrigerated trailer combination.
Figure 5:
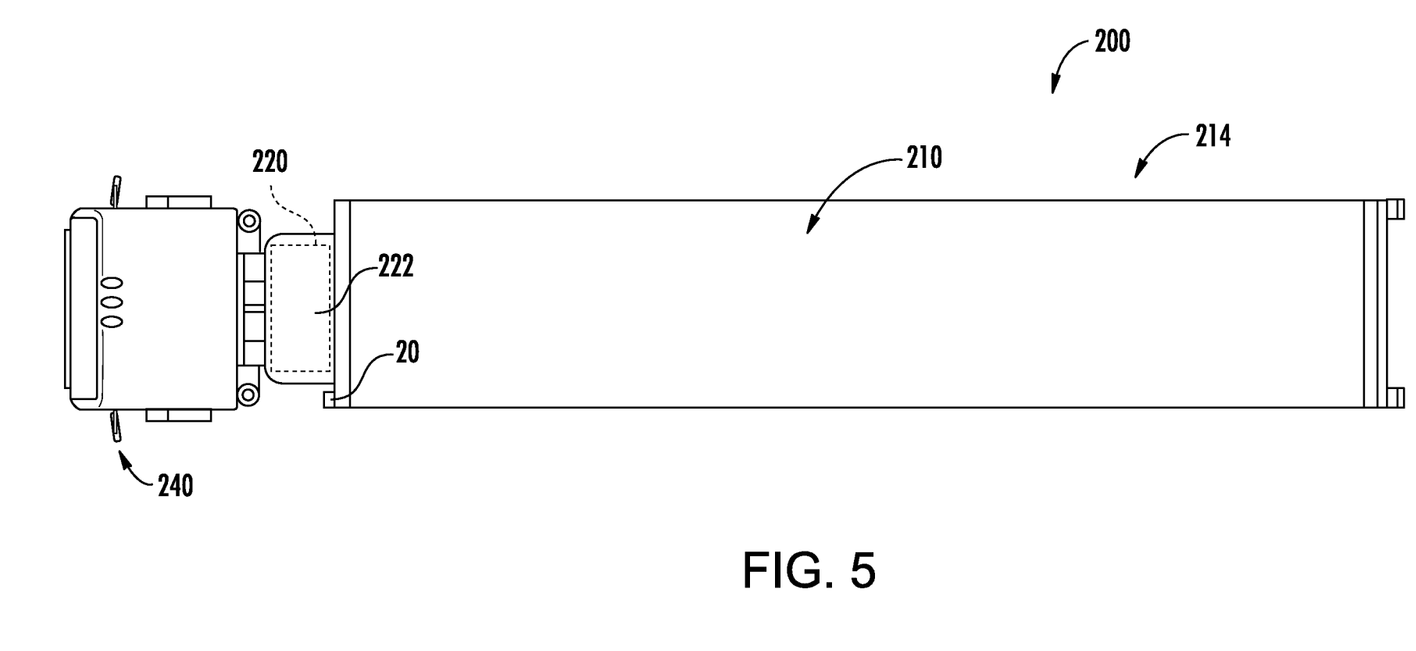
FIG. 5 is a top view of the combination of FIG. 4.

FIG. 4 shows a refrigerated transport system (transport refrigeration system) 200. The exemplary system 200 is a tractor 202 and trailer 204 combination. The exemplary tractor 202 comprises a cab 206 and a powertrain (e.g., diesel engine-based) for driving one or more sets of wheels. In the exemplary semi-trailer configuration, a forward portion of the trailer 204 is pivotally mounted atop a rear portion of the tractor and supported thereby. The trailer comprises a container or box 210 having an interior 212 and an exterior 214. The trailer further comprises a refrigeration system 220 positioned for cooling the interior. An exemplary refrigeration system 220 is mounted in an equipment box 222 along a front of the container.

The exemplary refrigeration system 220 is a vapor compression system comprising a compressor for driving refrigerant flow along a recirculating refrigerant flowpath. In normal cooling mode, the refrigerant flowpath proceeds downstream from an outlet or discharge port of the compressor through a heat rejection heat exchanger to reject heat to the external environment (e.g., via a fan-forced external airflow). Refrigerant may then be expanded such as in an expansion device (e.g., electronic expansion valve, thermal expansion valve, orifice, capillary device, or the like) and passed to a heat absorption heat exchanger in thermal communication with the interior (e.g., via a fan-forced internal airflow). After absorbing heat, refrigerant may return to a suction port or inlet of the compressor. An exemplary compressor is driven by an integral electric motor which, in turn, is powered by an internal combustion engine generator (genset). The foregoing is merely one basic example of a refrigeration system.

The exemplary display 20 is mounted proximate a forward driver's side end of the container so as to be visible by the driver seated in the cab using the driver's side rear view mirror 240 (FIG. 4) (e.g., within 0.1 m of the corner of the footprint of the container).

FIG. 4 further shows a controller 250. The controller may receive user inputs from an input device (e.g., switches, keyboard, or the like) and sensors (not shown, e.g., pressure sensors and temperature sensors at various refrigeration system locations, fuel, temperature, or other sensors associated with the genset, and/or other system, component, or operational parameter errors). The controller may be coupled to the sensors and controllable system components (e.g., valves, the bearings, the compressor motor, vane actuators, and the like) via control lines (e.g., hardwired or wireless communication paths) and similarly coupled to one or more output devices (and/or have integrated output devices). In the exemplary embodiment, the controller may be coupled to the indicator 20 via the connector 28 mating with a complementary connector on the controller. The controller may include one or more: processors; memory and/or storage (e.g., for storing program information for execution by the processor to perform the operational methods and for storing data used or generated by the program(s)); and hardware interface devices (e.g., ports) for interfacing with input/output devices and controllable system components. The exemplary indicator wiring and controller programming are effective to allow the controller to independently control the first and second LEDs or at least interdependently control them so that one group will be off when the other is on.

Thus, the controller may be configured (e.g., via programming or hard coding) to power the first LEDs in a normal situation and the second LEDs in one or more abnormal situations. Thus, the controller may be configured to determine such abnormal situations (e.g., low-fuel in a unit having a genset, engine over temperature, cargo box out of set point temperature range, and mechanical faults such as abnormally low or high pressure in the refrigeration system and/or other indication of loss of refrigerant) and responsively switch between the two conditions of the indicator display.

The system may be made using otherwise conventional or yet-developed materials and techniques.

Various parameters of manufacture, configuration, and use may be guided by the particular unit to which the display 20 is applied. For example, display 20 may be made as a drop-in-replacement for an existing LED display wherein groups of LEDs directly illuminate through lenses. In such a situation, the existing transport refrigeration system may be provided and the existing display removed. The replacement display 20 may be mechanically installed in place and electrically connected via the wiring 26 and/or connector 28 to the existing controller (e.g., in the equipment box). In other situations, the display 20 may be added as a retrofit of a system either lacking a display or with the retrofit preserving both the original display and the added display 20. In yet other systems, the display 20 may be included as an original equipment manufacture (OEM) feature.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

What is claimed is:

1. A transport refrigeration system (200) comprising:
   a tractor (202) having a driver's side;
   a trailer (204) comprising:
      a container (210) having an interior (212) and an exterior (214);
      a refrigeration system (220) mounted in an equipment box 222) along a front of the container and positioned for cooling the interior; and
      an indicator display (20) positioned on the exterior and comprising:
         a fluorescent plastic first member (30) of a first color and having a first face (40);
         a fluorescent plastic second member (32) of a second color, different from the first color, and having a first face (42);
         one or more first light emitting diodes (60) between the first member and the second member and positioned to illuminate the first member preferentially to the second member; and
         one or more second light emitting diodes (62) between the first member and the second member and positioned to illuminate the second member preferentially to the first member.

2. The transport refrigeration system of claim 1 wherein:
   the one or more first light emitting diodes are on a first strip or tape (70); and
   the one or more second light emitting diodes are on a second strip or tape (72) facing oppositely to the first strip or tape.

3. The transport refrigeration system of claim 1 wherein one or more of:
   the first and second members are fluorescent dye-doped acrylic;
   the first member first face and second member first face are coplanar; and
   the first member first face and second member first face bear relieved indicia (34, 36).

4. The transport refrigeration system of claim 1 wherein the indicator display further comprises:
   a light sensor (50).

5. The transport refrigeration system of claim 4 wherein:
   the light sensor is between the first member and the second member.

6. The transport refrigeration system of claim 4 wherein:
   the light sensor is a phototransistor.

7. The transport refrigeration system of claim 1 wherein the indicator display is positioned as to be visible by the driver seated in a cab of the tractor using a driver's side rear view mirror (240).

8. The transport refrigeration system of claim 7 wherein:
   the indicator display comprises an edge-lit indicator positioned within 0.10 meters of a driver's side forward corner of the footprint of the container.

9. The transport refrigeration system of claim 1 further comprising:
   a controller (250) configured to operate the indicator display:

in a first condition wherein the one or more first light emitting diodes are on and the one or more second light emitting diodes are off; and in a second condition wherein the one or more first light emitting diodes are off and the one or more second light emitting diodes are on.

10. The transport refrigeration system of claim 9 wherein the controller is configured to:

detect an abnormal situation; and responsive to the detecting, switch the indicator display from the first condition to the second condition.

11. The transport refrigeration system of claim 10 wherein:

the abnormal situation is selected from the group consisting of a low-fuel situation, a loss-of-refrigerant situation, engine over temperature, cargo box out of set point range, and high pressure in the refrigeration system.

12. A method for using the transport refrigeration system of claim 1, the method comprising:

operating in a first condition wherein the one or more first light emitting diodes are on and the one or more second light emitting diodes are off; and operating in a second condition wherein the one or more first light emitting diodes are off and the one or more second light emitting diodes are on.

13. The method of claim 12 further comprising:

detecting, via a controller (250), an abnormal situation; and responsive to the detecting, switching from the first condition to the second condition.

14. The method of claim 13 wherein:

the abnormal situation is selected from the group consisting of a low-fuel situation, a loss-of-refrigerant situation, engine over temperature, cargo box out of set point range, and high pressure in the refrigeration system.

15. The transport refrigeration system of claim 1 wherein:

the indicator display comprises an edge-lit indicator positioned within 0.10 meters of a left side forward corner of the footprint of the container.

16. A transport refrigeration system (200) comprising:

a container (210) having an interior (212) and an exterior (214);

a refrigeration system (220) positioned for cooling the interior; and an edge-lit indicator (20) positioned on the exterior, wherein:

the edge-lit indicator comprises:

a fluorescent plastic first portion (30) of a first color and having a first face (40);

a fluorescent plastic second portion (32) of a second color, different from the first color, and having a first face (42);

one or more first light emitting diodes (60) positioned to illuminate the first portion preferentially to the second portion; and one or more second light emitting diodes (62) positioned to illuminate the second portion preferentially to the first portion; and the edge-lit indicator is positioned within 0.10 meters of a driver's side forward corner of the footprint of the container.

17. The transport refrigeration system of claim 16 further comprising:

a controller (250) configured to operate the indicator display:

in a first condition wherein the one or more first light emitting diodes are on and the one or more second light emitting diodes are off; and in a second condition wherein the one or more first light emitting diodes are off and the one or more second light emitting diodes are on.

18. The transport refrigeration system of claim 16 wherein:

the fluorescent plastic first portion and the fluorescent plastic second portion each have a first face bearing relieved indicia (34, 36).

19. The transport refrigeration system of claim 16 wherein the edge-lit indicator is positioned as to be visible by the driver seated in a cab of the transport refrigeration system using a driver's side rear view mirror (240).

20. The transport refrigeration system of claim 1 wherein:

the first and second members are fluorescent dye-doped acrylic;

the first member first face and second member first face are coplanar; and the first member first face and second member first face bear relieved indicia (34, 36).

* * * * *